Dec. 29, 1936.    I. C. JENNINGS    2,065,704
VACUUM STEAM HEATING APPARATUS
Original Filed Sept. 15, 1930    2 Sheets-Sheet 1

Inventor
IRVING C. JENNINGS,
By Lathgate, Forg & Hawley
Attorneys

Dec. 29, 1936.　　　I. C. JENNINGS　　　2,065,704
VACUUM STEAM HEATING APPARATUS
Original Filed Sept. 15, 1930　　2 Sheets-Sheet 2

Inventor
IRVING C. JENNINGS,
By
Attorneys

Patented Dec. 29, 1936

2,065,704

UNITED STATES PATENT OFFICE 2,065,704

VACUUM STEAM HEATING APPARATUS

Irving C. Jennings, South Norwalk, Conn.

Original application September 15, 1930, Serial No. 481,825. Divided and this application January 26, 1932, Serial No. 589,014. Renewed July 24, 1935

2 Claims. (Cl. 237—9)

This application for patent is a division of an application for patent filed by me September 15th, 1930, Serial No. 481,825, Method of and apparatus for heating by steam, on which Letters Patent No. 1,851,434, was granted March 29th, 1932, and is filed in pursuance of a Patent Office requirement that the apparatus be claimed in a separate application.

The invention covered by this application has a special reference to a vacuum steam heating apparatus.

The term vacuum is used in this art to refer to sub-atmospheric pressures or partial vacuums.

In vacuum steam heating, steam is generated, and expanded and condensed in radiators, being drawn into and helped through the radiators by vacuum.

When more or less heat is needed the steam pressure is increased or decreased, the vacuum remaining the same, whereby a varying steam differential is employed.

As the flow of steam to and through the radiators depends on this differential, this method of employing a varying differential has the advantage of causing more steam to flow to and through the radiators when more heat is needed and less steam to flow when less heat is needed. But with this method of operation the differential is apt to become so large, when the steam pressure is materially increased as to cause objectionable noise in the radiators.

To overcome this difficulty and at the same time retain the advantages of a varying differential, I decrease or increase the vacuum a lesser degree as the steam pressure is increased or decreased.

By this improved apparatus, I am able to employ a differential, which varies directly with changes in the steam pressure but which never can become too great. Or in other words, by this improved apparatus, I am able to proportion the flow to and through the radiators to changes in the steam pressure, and at the same time avoid the difficulties before noted.

This apparatus is shown in the accompanying two sheets of drawings, in which

Figure 1:
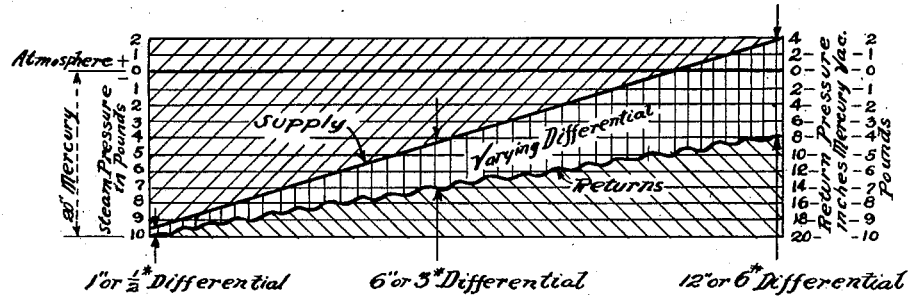
Fig. 1 is a diagram used for explaining the method.

Referring to the drawings and in detail, A designates the boiler, B the steam supply pipe, C one of the radiators, D the return line, and E the pumping apparatus of a vacuum steam heating system.

The supply pipe B is provided with a valve V and a pressure regulator G. The pumping apparatus E illustrated is that shown in Reissue Patent No. 15,637 granted to me June 26, 1923, and consists of a receiving and separating tank H, in which the returns are received and the air and gas separated from the condensate, and a pump which comprises a centrifugal water pump for returning the condensate to the boiler and a hydro-turbine air pump for creating and maintaining a vacuum in the return line and forcing the air and gas out of the system.

Figure 2:
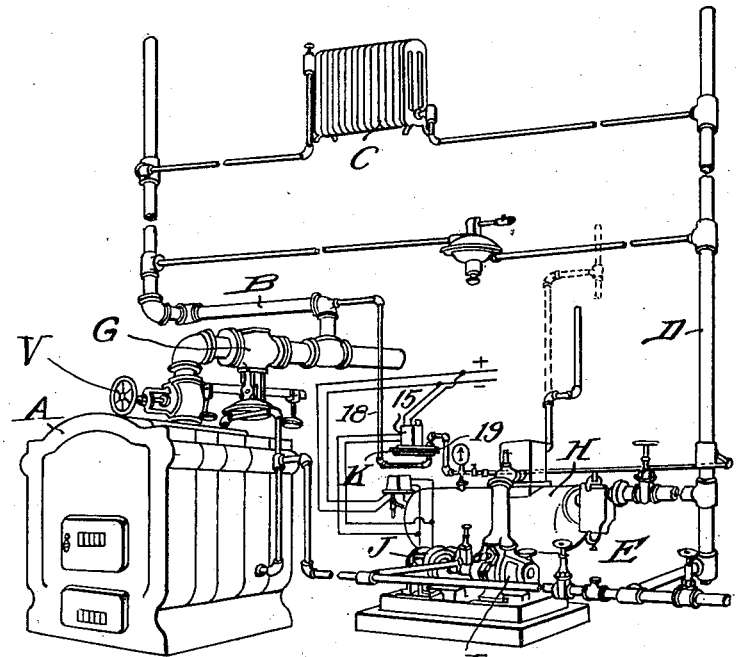
Fig. 2 is a perspective view of a vacuum steam heating system arranged to work according to my improved method.
Figure 5:
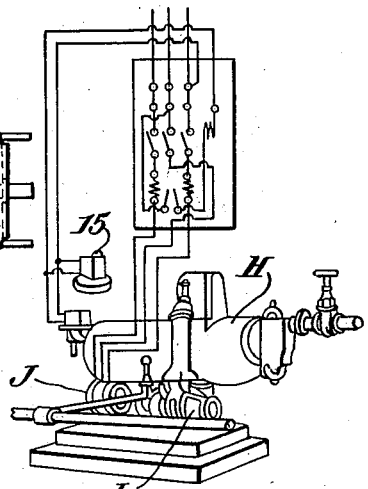
Fig. 5 is a diagram showing the electric wiring.

The pump I is driven by an electric motor J, which motor is controlled by float and vacuum control, wired as shown in Fig. 2 or through a magnetic starter as shown in Fig. 5.

The operation of this system and pumping mechanism is well understood and by using the same, steam under a vacuum or at less than atmospheric pressure may be utilized.

Figure 4:
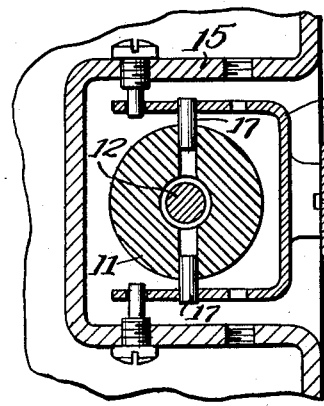
Fig. 4 is a sectional plan thereof on the line 4—4 of Fig. 3.
Figure 3:
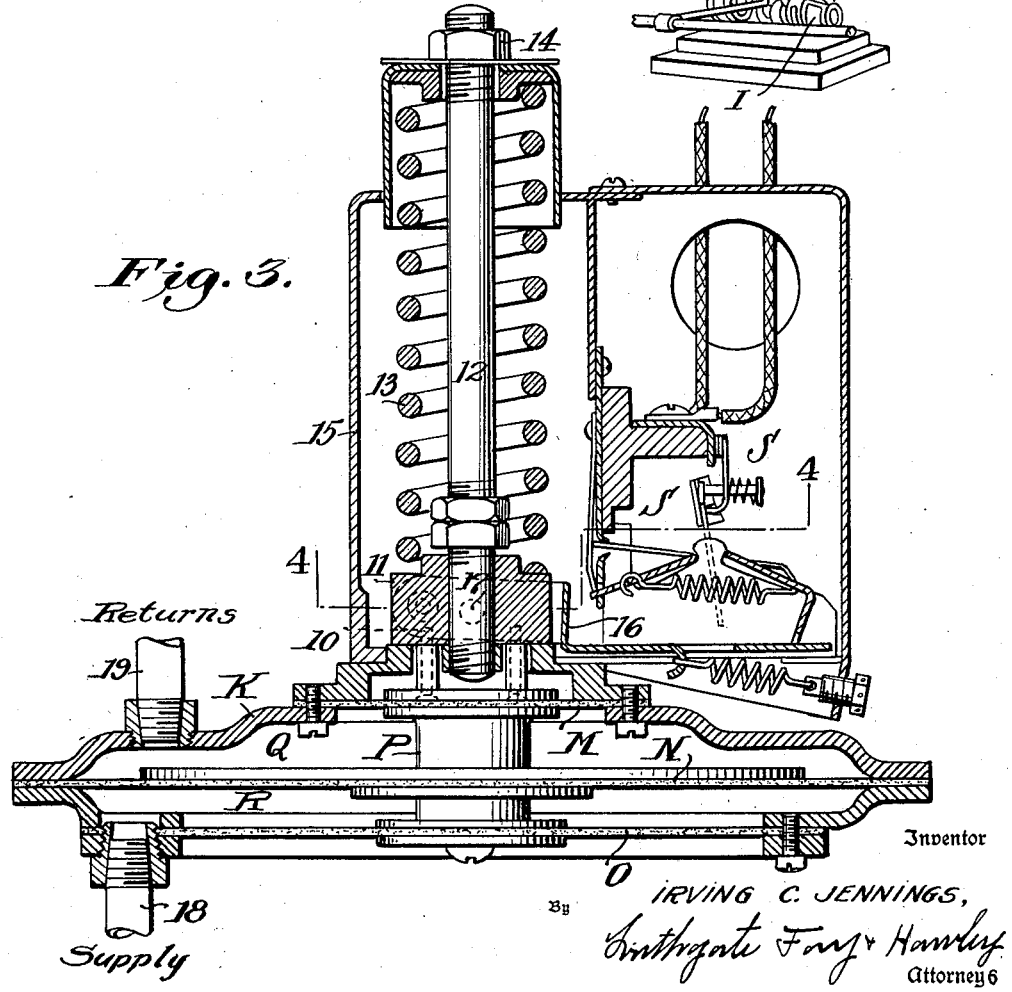
Fig. 3 is a sectional elevation actual size of the vacuum controller.

To practice my improvement, the vacuum controller is constructed as follows, reference being had to Figs. 3 and 4.

A casing K has three diaphragms M, N, and O arranged therein, the diaphragms being connected to move together by a spool or hub P. Pins or studs 10 are attached to the hub P and project through the casing and are secured in a thrust collar 11.

A stud 12 is secured in the casing and the collar 11 is fitted to slide thereon. A spring 13 is arranged on stud 12 to bear on collar 11, and the tension of the spring can be adjusted by nut 14 threaded on the end of stud 12. These parts are arranged in a suitable casing 15 secured to the top of the casing K. A yoke 16 is pivoted to the casing 15 and is provided with studs 17—17 which connect the same to the collar 11. This yoke is extended outwardly and forms the operating member of an electric switch S, secured to casing 15. This switch is a snap switch of any approved construction and controls the circuit which extends to the electric motor J. As shown the switch is closed, but if the diaphragms move upwardly the switch is opened.

The steam supply pipe B is connected to the space or chamber R between diaphragms N and O by pipe 18, and the return line D is connected to the space or chamber Q between diaphragms M and N by pipe 19. Thus the vacuum in the return line tends to lift diaphragm N, while vacuum in the supply tends to pull the same down, but pressure in the supply tends to lift N.

It will be noted that chamber Q forms a differential diaphragm chamber as the exposed area of N is greater than the exposed area of M, and that the chamber R forms a differential diaphragm chamber as the exposed area of N is greater than the exposed area of O. It will also be noted that N minus M is much larger than N minus O.

The action of the diaphragms is represented by the equation $F = [N$(absolute pressure in $R$—absolute pressure in $Q$) $+ O$ (atmospheric absolute—absolute pressure in $R$) $] - M$ (atmospheric absolute—absolute pressure in $Q$), in which "F" represents the upward force exerted by the diaphragms and the term "absolute" is used to translate the partial vacuums and pressures into terms which will eliminate the pressure of the atmosphere.

The operation can be understood by giving a specific illustration.

Assume that area of N minus area of M is twice area of N minus area of O and that the maximum partial vacuum which the vacuum pump is designed for is twenty inches of mercury or minus ten pounds per square inch.

The pumping mechanism is started in operation and the entire system is placed under vacuum until the switch opens. Now suppose steam is generated and that the same decreases the vacuum in the supply and in R one inch or one-half pound and also assume that when the supply and R are at nineteen inches, F will open the switch. This gives a steam differential of an inch or one-half pound as represented at the left of Fig. 1. This small differential will just about cause the steam to circulate.

Now suppose the steam pressure is raised six pounds from the assumed minimum which can be done by generating more steam in the boiler, manipulating valve V of adjusting pressure regulator G.

This will give a six inch or three pound steam differential as indicated in the middle of the diagram, Fig. 1, thus giving the desired ratio of increase of the steam differential.

The ratio will continue even if the steam pressure is increased above atmospheric pressure.

For example, if the steam pressure should be increased twelve pounds from the assumed minimum, to two pounds above atmospheric pressure, the vacuum needed in Q to open the switch will be reduced to eight inches or four pounds, as shown at the right in Fig. 1, giving a twelve inch or six pound steam differential.

From this, it will be seen I am able to obtain a differential between the supply pressure and return pressure which increases as the steam pressure increases but with a decreasing vacuum, and which decreases as the steam pressure decreases but with an increasing vacuum. Thus I am able to obtain the advantages before noted.

The figures and ratios above assumed are for the purpose of explanation and will be varied and departed from to meet the exigencies of any particular installation without departing from my invention.

The arrangements herein described may be varied by a skilled mechanic without departing from the scope of my invention as expressed in the claims.

Having thus fully described my invention, what I claim and desire to secure by Letters Patent is:—

1. A vacuum steam system having a source of steam supply, a radiator to which the same is connected, a return from the radiator, a vacuum pump to which the return connects, an electric motor for operating the pump, a switch for throwing said motor into and out of operation, and a vacuum controller provided with three diaphragms of different sizes forming side walls of two separate differential chambers and connected to operate the said switch, a connection from the supply to one of said chambers, and a connection from the return to the other of said chambers, the diphragm differential in which the supply pressure works being materially smaller than the diaphragm differential in which the pressure in the return works.

2. A vacuum steam heating system having a source of steam supply, a radiator to which the same is connected, a return from the radiator, a vacuum pump to which the return connects, an electric motor for operating the pump, a switch for throwing said motor into and out of operation, and a vacuum controller provided with three diaphragms of different sizes connected to operate said switch, the large diaphragm being arranged at the middle, the small diaphragm at one side of the large diaphragm, and the intermediate diaphragm at the other side of the large diaphragm, whereby two chambers having different diaphragm differentials are provided, a connection from the supply to the chamber having the smaller diaphragm differential, and a connection from the return to the chamber having the larger diaphragm differential.

IRVING C. JENNINGS.